(12) United States Patent
Chen et al.

(10) Patent No.: US 8,184,988 B2
(45) Date of Patent: May 22, 2012

(54) OPTICAL MODULATING DEVICE WITH FREQUENCY MULTIPLYING TECHNIQUE FOR ELECTRICAL SIGNALS

(75) Inventors: Jyehong Chen, Jhubei (TW); Chun-Ting Lin, Taichung (TW); Sheng-Peng Dai, Guanyin Township, Taoyuan County (TW); Peng-Chun Peng, Jhonghe (TW); Po-Tsung Shih, Tainan (TW); Sien Chi, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 521 days.

(21) Appl. No.: 12/385,230

(22) Filed: Apr. 2, 2009

(65) Prior Publication Data
US 2010/0008680 A1 Jan. 14, 2010

(30) Foreign Application Priority Data
Jul. 11, 2008 (TW) .............................. 97143109 A

(51) Int. Cl.
*H04B 10/04* (2006.01)
(52) U.S. Cl. ........ 398/187; 398/183; 398/185; 398/191; 398/198
(58) Field of Classification Search .................. 398/183, 398/185, 187, 191, 193, 198; 359/238, 245
See application file for complete search history.

(56) References Cited

U.S. PATENT DOCUMENTS

| | | | | |
|---|---|---|---|---|
| 5,040,865 | A * | 8/1991 | Chen et al. .................... | 385/2 |
| 6,362,913 | B2 * | 3/2002 | Ooi et al. ....................... | 359/245 |
| 6,407,845 | B2 * | 6/2002 | Nakamoto .................... | 359/239 |
| 6,661,976 | B1 * | 12/2003 | Gnauck et al. ................ | 398/183 |
| 6,781,741 | B2 * | 8/2004 | Uesaka .......................... | 359/279 |
| 6,836,622 | B2 * | 12/2004 | Kobayashi et al. ........... | 398/198 |
| 6,970,654 | B1 | 11/2005 | Paglione et al. | |
| 7,006,772 | B2 | 2/2006 | Kuri et al. | |
| 7,099,359 | B2 * | 8/2006 | Griffin .......................... | 372/26 |

(Continued)

OTHER PUBLICATIONS

Qingjian Chang, Tong Ye, and Yikai Su, "Generation of optical carrier suppresses-differential phase shift keying (OCS-DPSK) format using one dual-parallel Mach-Zehnder modulator in radio over fiber systems", Jul. 7 2008, Optics Express, vol. 16, No. 14.*

(Continued)

*Primary Examiner* — Kenneth N Vanderpuye
*Assistant Examiner* — Hibret Woldekidan
(74) *Attorney, Agent, or Firm* — Rosenberg, Klein & Lee

(57) ABSTRACT

The present invention relates to an optical modulating device with frequency multiplying technique for electrical signals, which primary comprises a mixer, which generates a mixed data signal from a first electrical signal and a second electrical signal. The mixed data signal is then received by a first phase shift device to have its phase shifted and becomes a first shifted signal. The first electrical signal is further received by a second phase shift device to have its phase shifted and becomes a second shifted signal. The present invention further comprises an integrated electro-optic modulator (Mach-Zehnder modulator), which is used to receive an input optical signal, the mixed data signal, the first shifted signal, the second shifted signal and the first electrical signal mentioned above, the integrated electro-optic modulator will then modulates the input optical signal into a frequency multiplying output optical signal that carries the first electrical signal and the second electrical signal. The present invention can carry and transmit amplitude shift keying signals and vector modulation signals, thereby provides a more advanced optical communication transmission service.

16 Claims, 7 Drawing Sheets

U.S. PATENT DOCUMENTS

| | | | |
|---|---|---|---|
| 7,257,078 B2 | 8/2007 | Liu et al. | |
| 7,280,759 B2 | 10/2007 | Okuno | |
| 7,308,210 B2* | 12/2007 | Khayim et al. | 398/198 |
| 7,555,226 B2* | 6/2009 | Tipper | 398/198 |
| 7,577,367 B2* | 8/2009 | Way | 398/183 |
| 7,751,724 B2* | 7/2010 | Hashimoto et al. | 398/183 |
| 7,773,283 B2* | 8/2010 | Tanaka et al. | 359/237 |
| 7,817,922 B2* | 10/2010 | Cho et al. | 398/183 |
| 7,817,923 B2* | 10/2010 | Akiyama et al. | 398/188 |
| 7,831,155 B2* | 11/2010 | Masuda et al. | 398/198 |
| 7,853,153 B2* | 12/2010 | Kawanishi et al. | 398/183 |
| 7,899,338 B2* | 3/2011 | Hashimoto et al. | 398/198 |
| 8,059,962 B2* | 11/2011 | Effenberger | 398/98 |
| 2002/0005975 A1* | 1/2002 | Nakamoto | 359/254 |
| 2002/0071152 A1* | 6/2002 | Blumenthal | 359/123 |
| 2002/0191261 A1* | 12/2002 | Notargiacomo et al. | 359/181 |
| 2003/0123121 A1* | 7/2003 | Ohhira | 359/238 |
| 2003/0165001 A1* | 9/2003 | Uesaka | 359/279 |
| 2003/0185575 A1* | 10/2003 | Ikeuchi | 398/197 |
| 2004/0184818 A1* | 9/2004 | Lee et al. | 398/183 |
| 2004/0208436 A1* | 10/2004 | Hakimi et al. | 385/27 |
| 2006/0034618 A1* | 2/2006 | Chen et al. | 398/198 |
| 2007/0139754 A1* | 6/2007 | Tsunoda | 359/237 |
| 2008/0239448 A1* | 10/2008 | Tanaka et al. | 359/245 |
| 2009/0214213 A1* | 8/2009 | Chen et al. | 398/79 |
| 2009/0304393 A1* | 12/2009 | Kawanishi et al. | 398/187 |
| 2010/0008665 A1* | 1/2010 | Chen et al. | 398/43 |
| 2010/0104294 A1* | 4/2010 | Chen et al. | 398/183 |
| 2010/0220376 A1* | 9/2010 | Kobayashi et al. | 359/238 |
| 2011/0008061 A1* | 1/2011 | Fujii | 398/203 |
| 2011/0026932 A1* | 2/2011 | Yeh et al. | 398/116 |
| 2011/0069964 A1* | 3/2011 | Yu et al. | 398/130 |
| 2011/0170876 A1* | 7/2011 | Lin et al. | 398/185 |

OTHER PUBLICATIONS

J, Yu, Z. Jia, Yi, Y. Su, G.K. Chang, T. Wang; Optical Millimeter-Wave Generation or Up-Conversion Using External Modulators; IEEE Photonics Technology Letter, vol. 18, No. 1, Jan. 1, 2006.

M. Attygalle, C. Lim, G.J. Pendock, A. Nirmalathas, G. Edvell; Transmission Improvement in Fiber Wireless Links Using Fiber Bragg Gratings; IEEE Photonics Technology Letters, vol. 17, No. 1, Jan. 2005.

V.J. Urick, J.X. Qiu, F. Bucholtz; Wide-Band QAM-Over-Fiber Using Phase Modulation and Interferometric Demodulation; IEEE Photonics Technology Letters, vol. 16, No. 10, Oct. 2004.

Y. Tang, W. Shieh, X. Yi, R. Evans; Optimum Design for RF-to-Optical Up-Converter in Coherent Optical OFDM Systems; IEEE Photonics Technology Letters, vol. 19, No. 7, Apr. 2007.

* cited by examiner

OPTICAL MODULATING DEVICE WITH FREQUENCY MULTIPLYING TECHNIQUE FOR ELECTRICAL SIGNALS

BACKGROUND OF THE INVENTION

1. Field of the Invention

The present invention relates to an optical modulating device, particularly to an optical modulating device with frequency multiplying technique for electrical signals.

2. Description of the Related Art

Fiber-optic communication is a communication method based on light and optical fibers. Light can be used to carry information after being modulated where it features a superior transmission capacity and a high information security. Since 1980s, the fiber-optic communication system plays a very important role in the digital world. In principle, the outgoing information is transferred from the sender side to the transmitter, and the signal modulates the carrier wave, which functions as the transmission medium of information, and then the modulated carrier wave is sent to the recipient side in a distant place, and the receiver demodulates the modulated carrier wave to obtain the original information.

System utilizing optical fiber to carry and transmit microwave signal would play an important role in future wideband wireless communication especially on millimeter-wave range of ultra wideband wireless communication that has frequency band above 40 GHz. The most common method for transforming microwave signal to optical signal is using an external optical modulator, and there are mainly three kinds of modulation methods: double-sideband (DSB), single-sideband (SSB) and double-sideband with optical carrier suppression (DSBCS) modulation. However, due to the fact that linear area for optical modulation system is not large, the depth of modulation for the system is being limited. As a result, using DSB and SSB for modulation will cause weaker sensitivity over distant transmission and dispersion of optical fiber will also weaken the microwave signal using DSB modulation. Compare to modulations using either DSB or SSB, the DSBCS modulation provides more promising bandwidth efficiency which requires only low frequency component, it also provides better sensitivity over long distance transmission. Nevertheless, DSBCS modulation can only transmit amplitude shift keying (ASK) modulation signal, it can not generate and transmit any signal in vector modulation format such as phase shift keying (PSK), quadrature amplitude modulation (QAM) signal and orthogonal frequency division multiplexing (OFDM) modulation signals.

To overcome the abovementioned problem, the present invention proposes a novel optical modulating device with frequency multiplying technique for electrical signals, not only does the present invention able to use low frequency component to generate frequency multiplying signals, but the present invention can also carry and transmit amplitude shift keying signals and vector modulation signals. In addition, the present invention can be combined with optical fiber cable network and wireless network to provide long distance optical communication transmission service.

SUMMARY OF THE INVENTION

The primary objective of the present invention is to provide an optical modulating device with frequency multiplying technique for electrical signals. The present invention is able to generate frequency multiplying signal using low frequency components, it can also carry and transmit amplitude shift keying signals and vector modulation signals.

Another objective of the present invention is to provide an optical modulating device with frequency multiplying technique for electrical signals which can be combined with existing optical fiber cable network and wireless network to provide long distance optical communication transmission service.

In order to realize the objectives mentioned above, the optical modulating device with frequency multiplying technique for electrical signals of the present invention mainly comprises an electrical signal generator, which is used to generate a first electrical signal; an optical signal generator, which is used to generate an input optical signal; and a mixer, which generates a mixed data signal from the first electrical signal and a second electrical signal wherein the second electrical signal can be either an amplitude shift modulation signal or a vector modulation signal. The mixed data signal is then received by a first phase shift device to have its phase shifted and becomes a first shifted signal. On the other hand, the first electrical signal is received by a second phase shift device to have its phase shifted and becomes a second shifted signal. The structure of the present invention further comprises an integrated electro-optic modulator (Mach-Zehnder modulator), which is used to receive the input optical signal, the mixed data signal, the first shifted signal, the second shifted signal and the first electrical signal mentioned above, the integrated electro-optic modulator will then modulates the input optical signal into a frequency multiplying output optical signal that carries the first electrical signal and the second electrical signal.

Below, the embodiments are described in detail in cooperation with the attached drawings to make easily understood the objectives, technical contents, characteristics and accomplishments of the present invention.

DETAILED DESCRIPTION OF THE INVENTION

Since the development for wireless and cable network has grown rapidly, the demand for higher transmission speed and bandwidth has also increased relatively. As a result, system utilizing optical fiber to carry and transmit microwave signal plays an important role in future wideband wireless communication especially on millimeter-wave's communicating sector. The present invention can generate and transmit vector signal in multiplying frequencies which can effectively reduce the use of bandwidth and system manufacturing cost, it can also increase the sensitivity of the system. Furthermore, the present invention can be widely applied on fields of microwave and optical fiber communication network.

Figure 1:
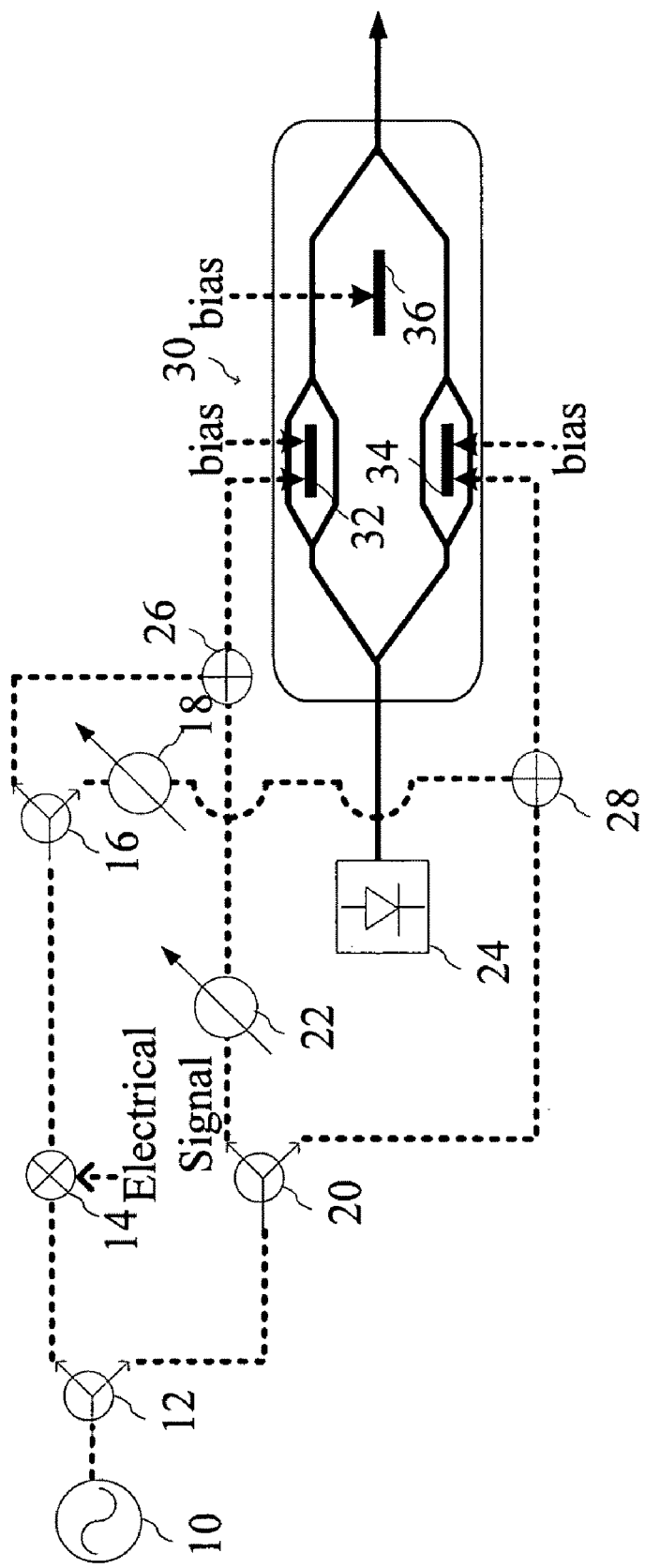
FIG. 1 is a diagram schematically showing the system architecture of the present invention.

Please refer to FIG. 1 for a diagram schematically showing the system architecture of the present invention where thick dashed line represents traveling path for electrical signal and thick solid line represents traveling path for optical signal. The present invention mainly comprises an electrical signal generator 10, a mixer 14, hybrid coupler 16 and 20, and adder 26 and 28. The electrical signal generator 10 is responsible for generating a sine signal, and the sine signal is then delivered to the mixer 14 and a hybrid coupler 20 (a phase shift device) respectively through a signal splitter 12. The mixer 14 receives the sine signal and an electrical signal, then output a mixed data signal. The electrical signal can be an amplitude shift modulation signal (ASK), a vector modulation signal, a phase shift modulation signal (PSK), a quadrature amplitude modulation signal (QAM) or orthogonal frequency-division multiplexing signal (OFDM). The mixed data signal is then delivered to the hybrid coupler 16 which also functions as a phase shift device. The hybrid coupler will shift the phase of the mixed data signal by 90 degrees and then output a first shifted signal along with the original mixed data signal to adder 26 and 28. The first shifted signal generated by hybrid coupler 16 can further deliver to a micro phase shifter 18 to have its phase more precisely adjusted to exact 90 degrees before sending to the adder 28. Similarly, hybrid coupler 20 which also functions as a phase shift device, receives and shifts the phase of the sine signal by 90 degrees and then output a second shifted signal along with the original sine signal to adder 26 and 28. The second shifted signal generated by hybrid coupler 16 can also further deliver to a micro phase shifter 22 to have its phase more precisely adjusted to exact 90 degrees before sending to the adder 26.

Both phase shift devices mentioned in the preferred embodiment of the present invention above utilizes hybrid couplers as illustration. When the system does not use hybrid coupler for any phase shift device, then one of the two phase shift devices may produce the first shifted signal only, which means adder 26 can only receive the mixed data signal from the mixer 14. Another phase shift devices may produce the second shifted signal only, which means adder 28 can only receive sine signal from signal splitter 12.

The adder 26 of the present invention is able to receive and add both the mixed data signal the second shifted signal. The adder 26 will then deliver the added signal to integrated electro-optic modulator 30. Similarly, adder 28 is able to receive and add both the sine signal the first shifted signal, then delivers the added signal to integrated electro-optic modulator 30 also. A laser diode 24 is also used to generate an input optical signal.

The integrated electro-optic modulator 30, which is also known as a Mach-Zehnder modulator, includes a first electro-optic modulating unit 32 which receives the input optical signal and signal sent from the adder 26, a second electro-optic modulating unit 34, which receives the input optical signal and signal sent from the adder 28 and a third electro-optic modulating unit 36. If the first electro-optic modulating unit 32 is being biased at the lowest $V_\pi$ value position, it could affect transmission characteristic of the input optical signal, allowing the input optical signal to be modulated by the mixed data signal and the second shifted signal to generate a first optical signal. Similarly, if the second electro-optic modulating unit 34 is being biased at the lowest $V_\pi$ value position, it could also affect transmission characteristic of the input optical signal, allowing the input optical signal to be modulated by the sine signal and the first shifted signal to generate a second optical signal. The third electro-optic modulating unit 36 receives both the first optical signal and the second optical signal. When the third electro-optic modulating unit 36 is being biased at $V_\pi/2$ value position, it could effect transmission characteristics of the first optical signal and the second optical signal, allowing optical modulating unit 36 to generate a frequency doubling output optical signal that carries both sine signal and electrical signal.

The following will describe the procedure of the present invention in detail. At first, an electrical signal generator 10 generates a sine signal, a signal splitter 12 then receives this sine signal and sends to a mixer 14 and a hybrid coupler 20 respectively. The mixer 14 will produce a mixed data signal after receiving both electrical signal and sine signal, and this mixed data signal will be delivered to a hybrid coupler 16 which is also a phase shift device. The hybrid coupler 16 will shift the phase of the mixed data signal by 90 degrees and output a first shifted signal along with the original mixed data signal. The first shifted signal further goes through a micro phase shifter 18 to have its phase adjusted more precisely in order to make sure that the phase between the first shifted signal and the mixed data signal is exactly different by 90 degrees, from there, the adjusted first shifted signal is sent to the adder 28 where the original mixed data signal is sent to adder 26. Similarly, hybrid coupler 20 receives and shifts the phase of the sine signal by 90 degrees, then outputs a second shifted signal along with the original sine signal. The second shifted signal also goes through a micro phase shifter 22 to have its phase adjusted more precisely in order to make sure that the phase between the second shifted signal and the original sine signal is exactly different by 90 degrees, from there, the adjusted second shifted signal is sent to the adder 26 where the original sine signal is sent to adder 28.

When the system mentioned above does not use hybrid coupler for any of its phase shift device, then one of the two phase shift devices may produce the first shifted signal only, which means adder 26 can only receive the mixed data signal from the mixer 14. Another phase shift devices may produce the second shifted signal only, which means adder 28 can only receive sine signal from signal splitter 12.

The adder 26 will add the mixed data signal with the second shifted signal, then sending the resulting signal to a first electro-optic modulating unit 32 whereas adder 28 will add the sine signal with the first shifted signal, then sending the resulting signal to a second electro-optic modulating unit 34. In addition, the first electro-optic modulating unit 32 receives an input optical signal from a laser diode 24. Since the first electro-optic modulating unit 32 is biased to the lowest $V_\pi$ value position, so it could affect transmission characteristic of the input optical signal, allowing the input optical signal to be modulated by the mixed data signal and the second shifted signal to generate a first optical signal. Similarly, the second electro-optic modulating unit 34 also receives an input optical signal from the laser diode 24. Since the second electro-optic modulating unit 34 is also biased to the lowest $V_\pi$ value position, it could affect transmission characteristic of the input optical signal, allowing the input optical signal to be modulated by the sine signal and the first shifted signal to generate a second optical signal. A third electro-optic modulating unit 36 receives both the first optical signal and the second optical signal. Since the third electro-optic modulating unit 36 is biased to $V_\pi/2$ value position, it could effect transmission characteristics of the first optical signal and the second optical signal, allowing optical modulating unit 36 to generate a frequency doubling output optical signal that carries both sine signal and electrical signal.

Figure 2:
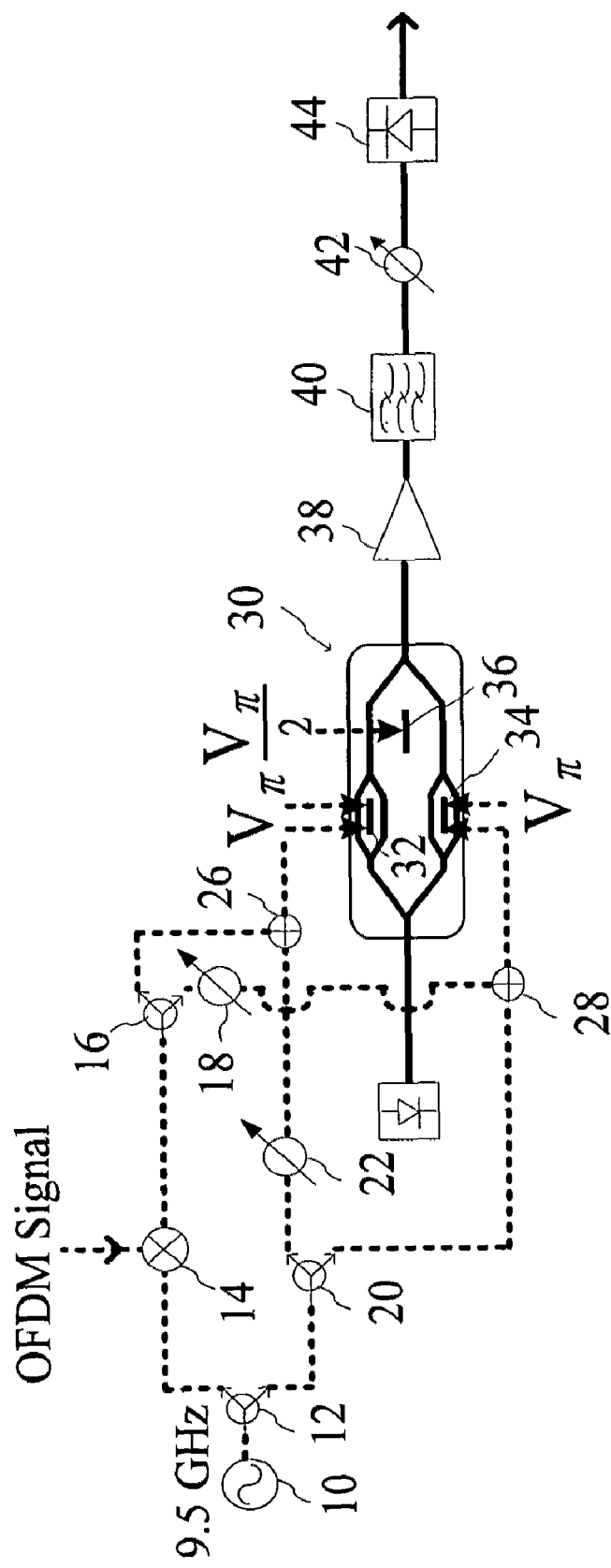
FIG. 2 is a diagram schematically showing the experimental system architecture of the present invention.

In order to proof the practicability of the present invention, please refer to FIG. 2 for a diagram schematically showing the architecture of an experimental system of the present invention. In this setup, the frequency of the sine signal is about 9.5 GHz and the electrical signal uses a 4 GB/s OFDM signal for illustration. The major difference between the experimental system (FIG. 2) and the system in FIG. 1 is that there is an additional optical fiber amplifier (EDFA) 38, optical band pass filter (OBPF) 40 and optical attenuator 42 installed on output of the integrated electro-optic modulator 30 respectively. When outputting the output optical signal from the integrated electro-optic modulator 30, the output optical signal can amplify its signal strength through optical fiber amplifier 38, allowing the signal of output optical signal to be attenuated slower within the optical fiber transmitting channel. The optical band pass filter 40 is responsible for filtering out the unneeded frequencies from the output optical signal and the optical attenuator 42 is responsible for adjusting the strength of the output optical signal, the adjusted output optical signal is than delivered to the optical fiber transmitting channel. When output optical signal pass through optical fiber transmitting channel, an optical detector 44 can be used to extract electrical signal spectrum of the output optical signal.

When transmitting wireless electrical signals with phase difference of 90 degrees separately to the first electro-optic modulating unit 32 and the second electro-optic modulating unit 34, and biasing both modulating units to lowest value position, optical, the optical signal spectrum generated will include upper sideband (USB), lower sideband (LSB) and suppressed carrier. When third electro-optic modulating unit 36 is biased to middle value position, one of the USB or LSB of the last output signals of integrated electro-optic modulator 30 will be eliminated.

Figure 3A:
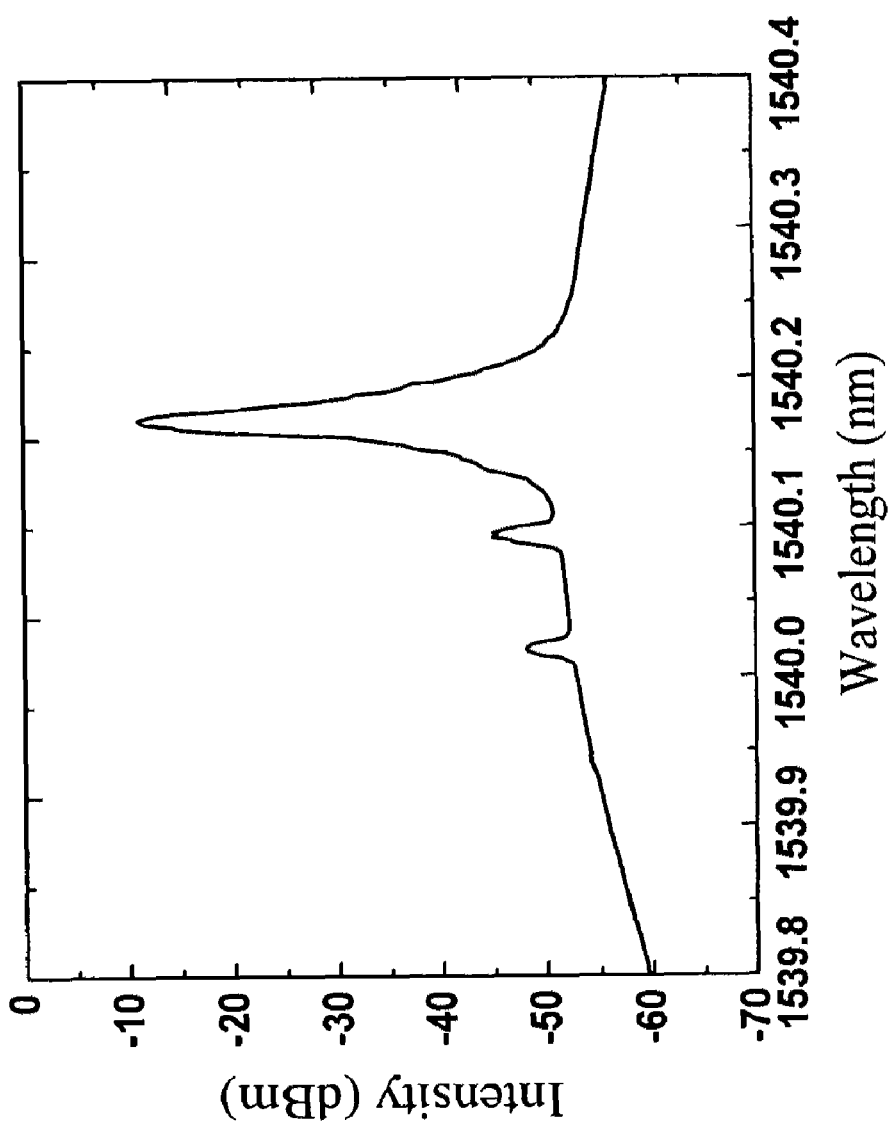
FIG. 3(a) is an optical signal spectrum diagram schematically showing the sine signal of the present invention.
Figure 3B:
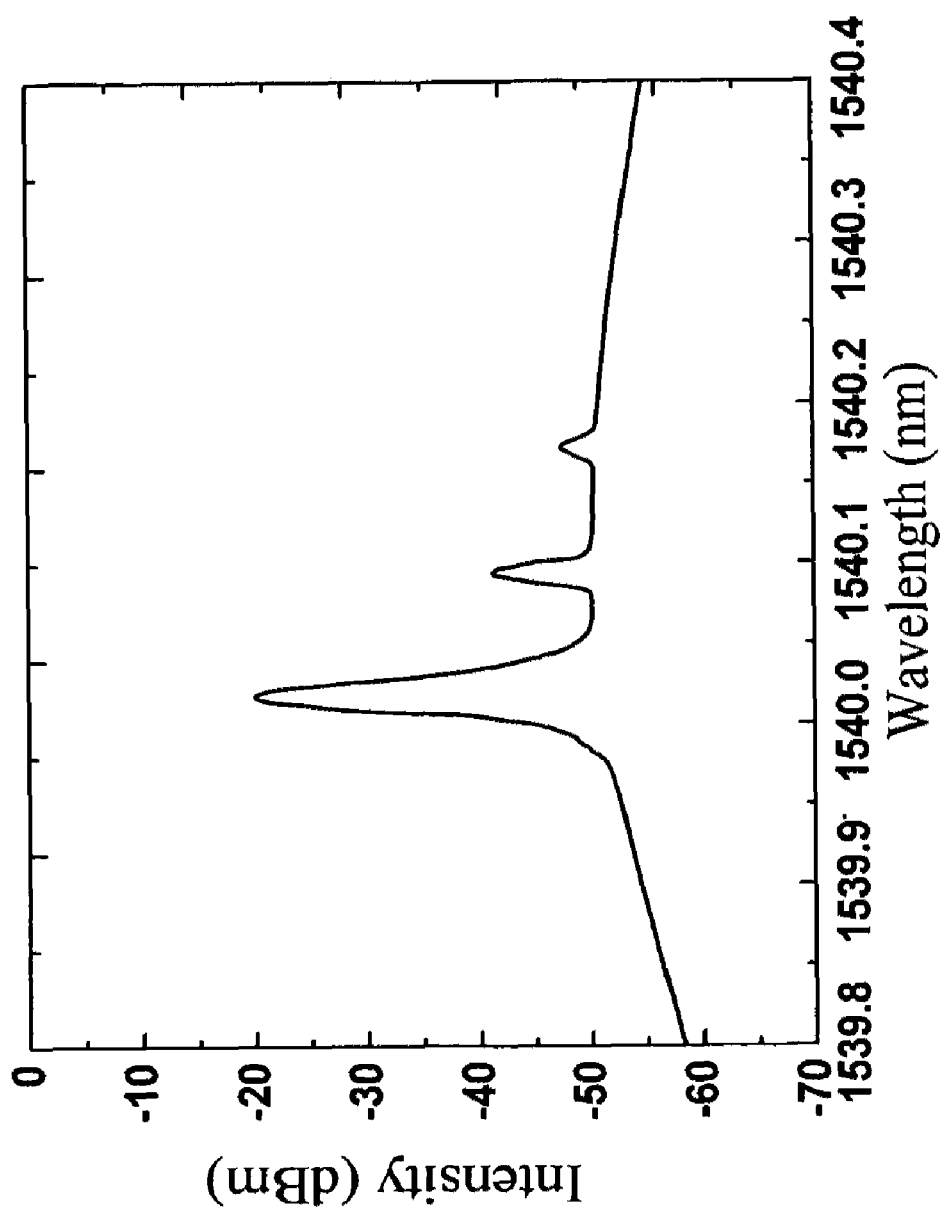
FIG. 3(b) is an optical signal spectrum diagram schematically showing the OFDM signal of the present invention.
Figure 3C:
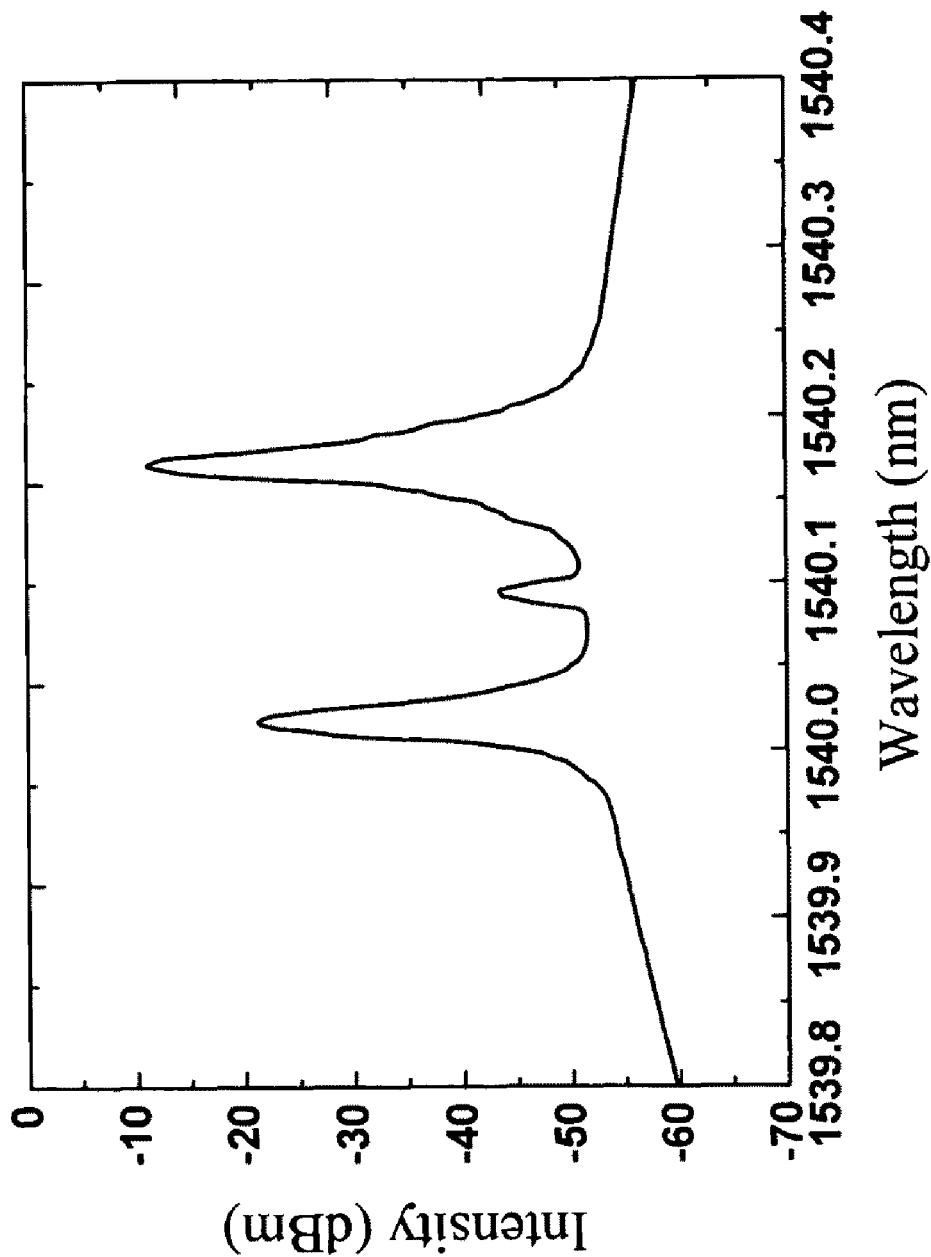
FIG. 3(c) is an optical signal spectrum diagram schematically showing both the sine signal and OFDM signal of the present invention.

Please refer to FIG. 2, FIG. 3(a), FIG. 3(b) and FIG. 3(c) at the same time for following illustrations. First considering the sine signal, when sine signals with phase difference of 90 degrees is transmitted to the first electro-optic modulating unit 32 and the second electro-optic modulating unit 34 respectively, as shown in FIG. 3(a), the LSB of the sine signal outputted by the integrated electro-optic modulator 30 is being eliminated, leaving only USB of the sine signal behind. Similarly for mixed data signal, when mixed data signals with phase difference of 90 degrees is transmitted to the first electro-optic modulating unit 32 and the second electro-optic modulating unit 34 respectively, as shown in FIG. 3(b), the USB of the mixed data signal outputted by the integrated electro-optic modulator 30 is being eliminated, leaving only LSB of the mixed data signal behind. Therefore, as shown in FIG. 3(c), if the sine signal and the mixed data signal are being transmitted simultaneously, then the integrated electro-optic modulator 30 will be able to output the LSB of the mixed data signal and the USB of the sine signal at the same time. The present invention allows wireless electrical signal to be modulated on either USB or LSB of a signal. Moreover, the signal power and strength of USB and LSB of the signal can each be adjusted individually to reach the best performance for the system. The use of frequency doubling technique can greatly reduce the cost of high frequency components, especially on wireless electrical signal with millimeter-wave range above 40 GHz.

Figure 4B:
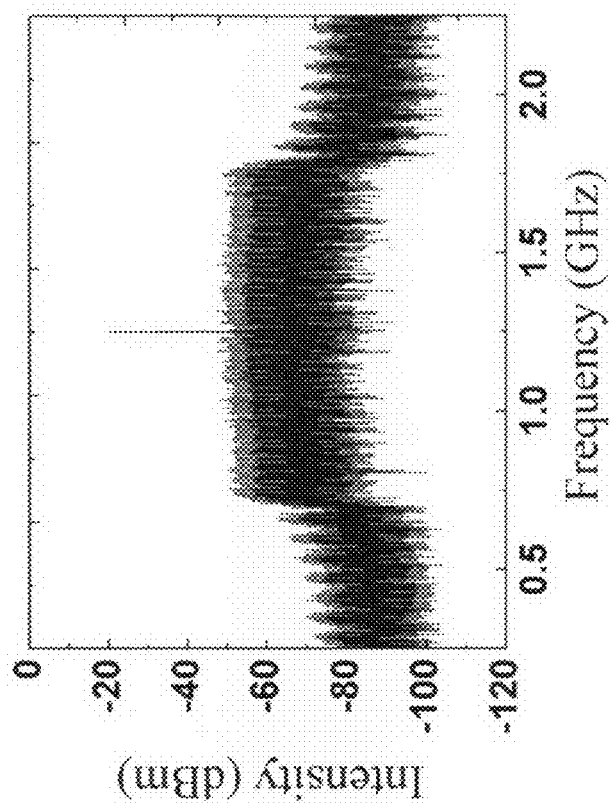
FIG. 4(b) is an electrical signal spectrum diagram schematically showing the OFDM signal of the present invention after frequency reduction.
Figure 4A:
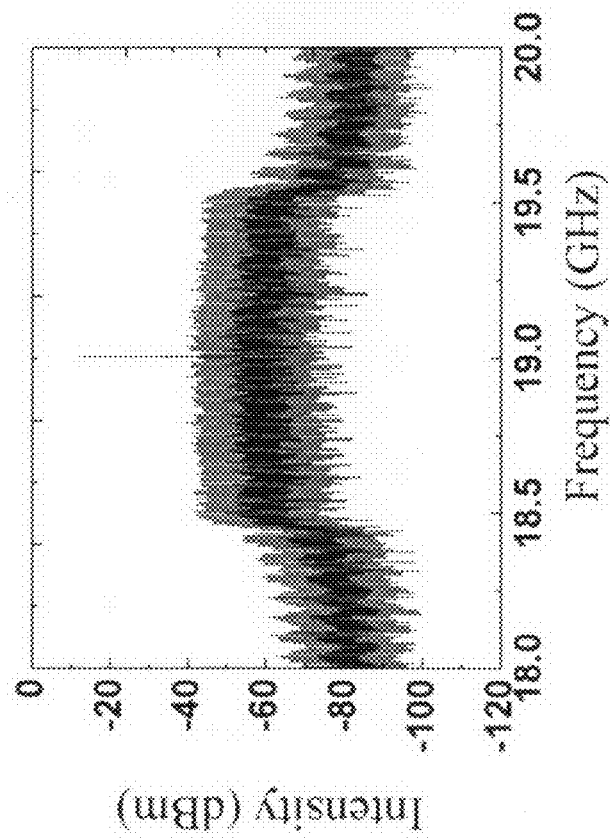
FIG. 4(a) is an electrical signal spectrum diagram schematically showing the OFDM signal of the present invention.

Please refer to FIGS. 4(a) and 4(b) at the same time where FIG. 4(a) is an electrical signal spectrum diagram schematically showing the OFDM signal of the present invention. As the fig. shown, the frequency of the signal is 19 GHz, which is twice of 9.5 GHz, can be transmitted directly using an antenna. FIG. 4(b) is an electrical signal spectrum diagram schematically showing the OFDM signal of the present invention after frequency reduction, the OFDM signal after frequency reduction can be demodulated to obtain the original signal.

Figure 5A:
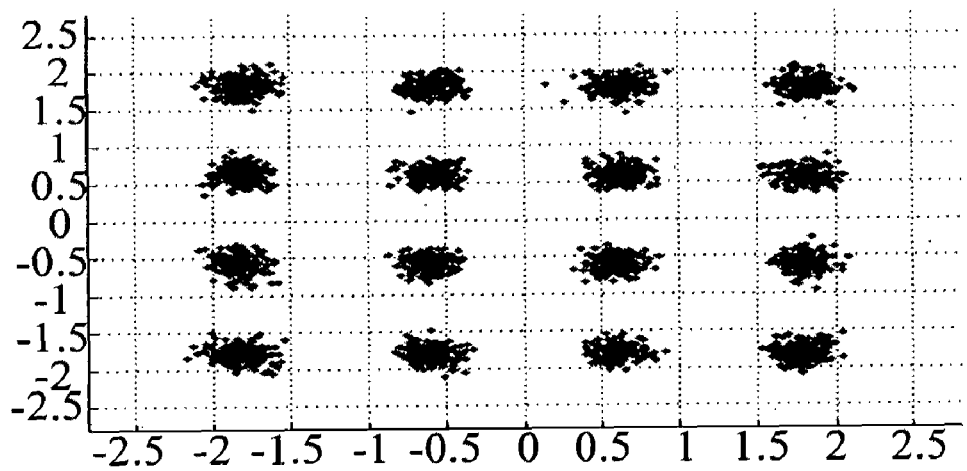
FIG. 5(a) is a constellation chart schematically showing the OFDM signal of the present invention before transmission.
Figure 5B:
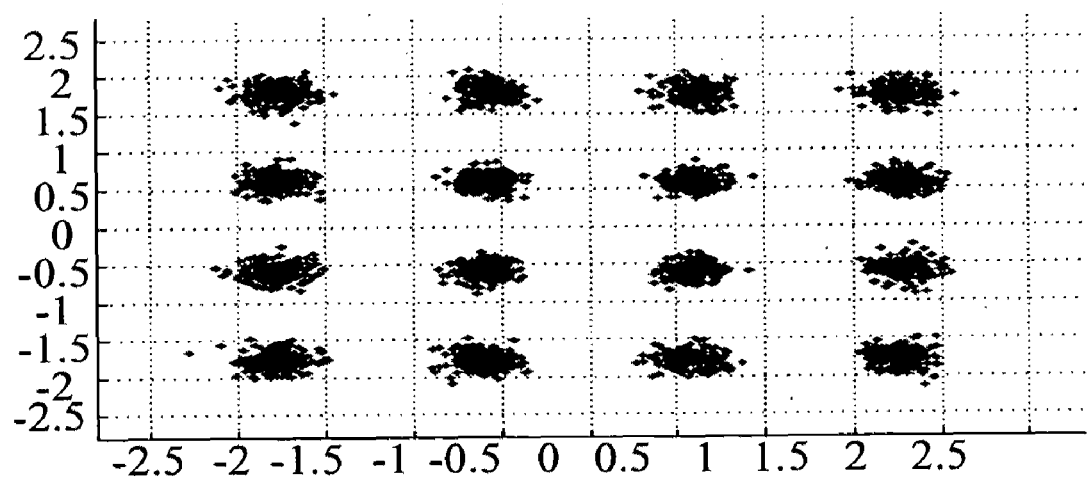
FIG. 5(b) is a constellation chart schematically showing the OFDM signal of the present invention after transmitted 50 kilometers.

Please refer to FIGS. 5(a) and 5(b) at the same time where FIG. 5(a) is a constellation chart schematically showing the demodulated OFDM signal of the present invention before transmission and FIG. 5(b) is a constellation chart schematically showing the demodulated OFDM signal of the present invention after transmitted 50 kilometers. Although the two constellation charts are being measured before and after the transmission respectively, the data for both charts are very identical. From this point, it can be seen that a vector signal has been transmitted and demodulated successfully without any loss, which proofs the practicability of the present invention.

Not only does the present invention is able to use low frequency component to generate frequency multiplying signal that carries amplitude shift modulation signal and vector modulation signal, it can also combine with optical fiber network and wireless network to provide a more advancing long distance optical communication transmission service, which proofs the present invention to be very practical. The embodiments described above are only to exemplify the present invention but not to limit the scope of the present invention. Therefore, any equivalent modification or variation according to the shapes, structures, characteristics and spirits discloses in the present invention is to be also included within the scope of the present invention.

What is claimed is:

1. An optical modulating device with frequency multiplying technique for electrical signals comprising:
    an electrical signal generator, which generates a first electrical signal, said first electrical signal is split through a signal splitter;
    a mixer, which receives said first electrical signal from said signal splitter and a second electrical signal, then generates and sends out a mixed data signal;
    a first phase shift device, which receives and shifts phase of said mixed data signal, then sends out a first shifted signal;
    a second phase shift device, which receives and shifts phase of said first electrical signal from said signal splitter, then sends out a second shifted signal;
    an optical signal generator, which generates a input optical signal;
    an integrated electro-optic modulator (Mach-Zehnder modulator), which receives said input optical signal, said mixed data signal, said first shifted signal, said second shifted signal and said first electrical signal, then modulates said input optical signal into a frequency multiplying output optical signal that carries said first electrical signal and said second electrical signal; and
    a signal splitter, which receives said first electrical signal from said electrical signal generator, then sends said first electrical signal to said mixer and said second phase shift device separately;
    wherein said frequency multiplying output optical signal is a frequency doubling output optical signal.

2. The optical modulating device with frequency multiplying technique for electrical signals according to claim 1, wherein said integrated electro-optic modulator further comprises:
    a first electro-optic modulating unit, which receives said input optical signal, said mixed data signal and said second shifted signal, when said first electro-optic modulating unit is being biased, it affects transmission characteristic of said input optical signal, allowing said input optical signal to be modulated by said mixed data signal and said second shifted signal to generate a first optical signal;

a second electro-optic modulating unit, which receives said input optical signal, said first electrical signal and said first shifted signal, when said second electro-optic modulating unit is being biased, it affects transmission characteristic of said input optical signal, allowing said input optical signal to be modulated by said first electrical signal and said first shifted signal to generate a second optical signal; and a third electro-optic modulating unit, which receives said first optical signal and said second optical signal, when said third electro-optic modulating unit is being biased, it affects transmission characteristic of said first optical signal and said second optical signal and generates said frequency multiplying output optical signal.

3. The optical modulating device with frequency multiplying technique for electrical signals according to claim 2, wherein phase of said first shifted signal and said mixed data signal is different by 90 degrees.

4. The optical modulating device with frequency multiplying technique for electrical signals according to claim 2, wherein phase of said second shifted signal and said first electrical signal is different by 90 degrees.

5. The optical modulating device with frequency multiplying technique for electrical signals according to claim 2 further comprises an adder, which receives and adds said mixed data signal and said second shifted signal, then sends resulting signal to said first electro-optic modulating unit.

6. The optical modulating device with frequency multiplying technique for electrical signals according to claim 2, further comprises an adder, which receives and adds said first electrical signal and said first shifted signal, then sends resulting signal to said second electro-optic modulating unit.

7. The optical modulating device with frequency multiplying technique for electrical signals according to claim 2, wherein bias value for said first electro-optic modulating unit and said second electro-optic modulating unit is $V_\pi$ and bias value for said third electro-optic modulating unit has bias value is $V_\pi/2$.

8. The optical modulating device with frequency multiplying technique for electrical signals according to claim 1, wherein said first electrical signal is a sine signal.

9. The optical modulating device with frequency multiplying technique for electrical signals according to claim 1, wherein said second electrical signal is an amplitude shift modulation signal, a vector modulation signal, a phase shift modulation signal, a quadrature amplitude modulation signal or an orthogonal frequency division multiplexing signal.

10. The optical modulating device with frequency multiplying technique for electrical signals according to claim 1, wherein said optical signal generator is a laser diode.

11. The optical modulating device with frequency multiplying technique for electrical signals according to claim 1, wherein said first phase shift device comprises a hybrid coupler; and after said first phase shift device shifted phase of said mixed data signal, said first phase shift device can further send said mixed data signal and said first shifted signal to said integrated electro-optic modulator.

12. The optical modulating device with frequency multiplying technique for electrical signals according to claim 1, wherein said first shifted signal from said first phase shift device can go through a micro phase shifter to have its phase more precisely adjusted before sending to said integrated electro-optic modulator, allowing said first shifted signal and said mixed data signal have phase different by exactly 90 degrees.

13. The optical modulating device with frequency multiplying technique for electrical signals according to claim 1, wherein said second phase shift device comprises a hybrid coupler; and after said second phase shift device shifted phase of said first electrical signal, said second phase shift device can further send said first electrical signal and said second shifted signal to said integrated electro-optic modulator.

14. The optical modulating device with frequency multiplying technique for electrical signals according to claim 1, wherein said second shifted signal from said second phase shift device can go through a micro phase shifter to have its phase more precisely adjusted before sending to said integrated electro-optic modulator, allowing said second shifted signal and said first electrical signal have phase different by exactly 90 degrees.

15. An optical modulating device with frequency multiplying technique for electrical signals comprising:

an electrical signal generator, which generates a first electrical signal, said first electrical signal is split through a signal splitter;

a mixer, which receives said first electrical signal from said signal splitter and a second electrical signal, then generates and sends out a mixed data signal;

a first phase shift device, which receives and shifts phase of said mixed data signal, then sends out a first shifted signal;

a second phase shift device, which receives and shifts phase of said first electrical signal from said signal splitter, then sends out a second shifted signal;

an optical signal generator, which generates a input optical signal; and an integrated electro-optic modulator (Mach-Zehnder modulator), which receives said input optical signal, said mixed data signal, said first shifted signal, said second shifted signal and said first electrical signal, then modulates said input optical signal into a frequency multiplying output optical signal that carries said first electrical signal and said second electrical signal;

wherein said first shifted signal from said first phase shift device can go through a micro phase shifter to have its phase more precisely adjusted before sending to said integrated electro-optic modulator, allowing said first shifted signal and said mixed data signal have phase different by exactly 90 degrees.

16. An optical modulating device with frequency multiplying technique for electrical signals comprising:

an electrical signal generator, which generates a first electrical signal, said first electrical signal is split through a signal splitter;

a mixer, which receives said first electrical signal from said signal splitter and a second electrical signal, then generates and sends out a mixed data signal;

a first phase shift device, which receives and shifts phase of said mixed data signal, then sends out a first shifted signal;

a second phase shift device, which receives and shifts phase of said first electrical signal from said signal splitter, then sends out a second shifted signal;

an optical signal generator, which generates a input optical signal; and an integrated electro-optic modulator (Mach-Zehnder modulator), which receives said input optical signal, said mixed data signal, said first shifted signal, said second shifted signal and said first electrical signal, then modulates said input optical signal into a frequency multiplying output optical signal that carries said first electrical signal and said second electrical signal;
wherein said second shifted signal from said second phase shift device can go through a micro phase shifter to have its phase more precisely adjusted before sending to said integrated electro-optic modulator, allowing said second shifted signal and said first electrical signal have phase different by exactly 90 degrees.

* * * * *